(12) United States Patent
Yang

(10) Patent No.: US 12,014,241 B1
(45) Date of Patent: Jun. 18, 2024

(54) WIRELESS BARCODE SCANNING GUN WITH ELECTRONIC TAG SETTING FUNCTION

(71) Applicant: ADM TECH LLC, Monterey Park, CA (US)

(72) Inventor: Fang Yang, Monterey Park, CA (US)

(73) Assignee: ADM TECH LLC

( * ) Notice: Subject to any disclaimer, the term of this patent is extended or adjusted under 35 U.S.C. 154(b) by 0 days.

(21) Appl. No.: 18/393,039

(22) Filed: Dec. 21, 2023

(30) Foreign Application Priority Data

Oct. 20, 2023 (CN) .......................... 202322818891.9

(51) Int. Cl.
*G06K 7/10* (2006.01)

(52) U.S. Cl.
CPC ..... *G06K 7/10198* (2013.01); *G06K 7/10386* (2013.01); *G06K 7/10881* (2013.01); *G06K 2007/10524* (2013.01)

(58) Field of Classification Search
CPC .......... G06K 7/10198; G06K 7/10386; G06K 7/10881; G06K 2007/10524; G06K 7/0004; G06Q 10/087; G06Q 20/208
See application file for complete search history.

(56) References Cited

U.S. PATENT DOCUMENTS

| | | | |
|---|---|---|---|
| 11,487,957 B2* | 11/2022 | Teshirogi | G06Q 10/087 |
| 2008/0297349 A1* | 12/2008 | Leone | G08B 13/2477 |
| | | | 340/572.1 |

OTHER PUBLICATIONS

Japanese Patent document JP-7352475-B2 translation (Year: 2023).*
Japanese Patent document JP-2021128722-A translation (Year: 2021).*

* cited by examiner

*Primary Examiner* — Vernal U Brown

(57) ABSTRACT

The utility model discloses a wireless barcode scanning gun with an electronic tag setting function. The wireless barcode scanning gun includes a barcode scanning gun body, a master control component, an RFID identification component, an RFID tag component and a tag component. The barcode scanning gun body is used for scanning data of the tag component and transmitting the data to the master control component; the master control board and the RFID identification component are both mounted on the barcode scanning gun body; a unique identification code is stored in the RFID tag component; the RFID identification component is used for reading data of the RFID tag component and sending the data to the master control component. By means of the above method, the utility model achieves parameter matching of the tag component, and binds the matched parameters of a plurality of tag components to one RFID tag component.

10 Claims, 4 Drawing Sheets

WIRELESS BARCODE SCANNING GUN WITH ELECTRONIC TAG SETTING FUNCTION

TECHNICAL FIELD

The utility model relates to the technical field of barcode scanning guns, and in particular to a wireless barcode scanning gun with an electronic tag setting function.

BACKGROUND

A barcode scanning gun is a device for rapidly scanning a barcode or a QR code. It usually uses an optical sensor or a laser scanner to read information on the barcode, and convert the information into digital data for processing on a computer or other devices. The barcode scanning gun is widely applied to the retail industry, the logistics industry, the warehousing industry, the medical industry and other industries, capable of improving the working efficiency and accuracy. When the barcode scanning gun is used, it is only necessary to point a gun head at the barcode or the QR code, and trigger a scanning button or automatic inductive scanning, and then the information on the barcode is rapidly read and transmitted to a corresponding device.

When the current barcode scanning gun is used, a configuration parameter of the QR code or the barcode is stored in a memory of the barcode scanning gun. In a case that the barcode scanning gun scans the QR code or the barcode, after the barcode scanning gun processes scanned data, it matches the scanned data to the corresponding parameter in its memory. Its long data retrieval time requires high data retrieval ability of the barcode scanning gun.

Based on this, the utility model designs a wireless barcode scanning gun with an electronic tag setting function, so as to solve the above problems.

SUMMARY

Aiming to the above disadvantages in the prior art, the utility model provides a wireless barcode scanning gun with an electronic tag setting function.

In order to achieve the above objective, the utility model is implemented through the following technical solution:

A wireless barcode scanning gun with an electronic tag setting function includes a barcode scanning gun body, a master control component, an RFID identification component, an RFID tag component and a tag component, where the barcode scanning gun body is used for scanning data of the tag component and transmitting the data to the master control component;

the master control component and the RFID identification component are both mounted on the barcode scanning gun body;

a unique identification code is stored in the RFID tag component;

the RFID identification component is used for reading data of the RFID tag component and sending the data to the master control component;

the master control component is electrically connected with a communication component, and the communication component is in wireless communication connection to user equipment, and used for transmitting data between the master control component and the user equipment;

the user equipment is used for setting a configuration parameter, matched with data of the tag component, naming the configuration parameter a configuration, matched with the unique identification code of the RFID tag component, of RFID naming information, and sending the configuration to the master control component; and the master control component is used for storing the configuration of the RFID naming information while retrieving the configuration of the RFID naming information, and processes data sent by the barcode scanning gun body and the RFID identification component.

More further, the tag component a QR code or a barcode; and the RFID tag component is an RFID electronic tag.

More further, the barcode scanning gun body includes a barcode scanning gun main body, a window and a barcode scanning component, where the window is formed in the barcode scanning gun main body; the barcode scanning component is fixedly mounted on the barcode scanning gun main body, and located at the window; and the master control component and the RFID identification component are both fixedly mounted on the barcode scanning gun main body.

More further, the master control component is a master control board; and the master control board is electrically connected to the RFID identification component, the communication component and the barcode scanning component.

More further, the RFID identification component is fixedly mounted at an inner end of the barcode scanning gun main body.

More further, the communication component is a Bluetooth module or a wifi module.

More further, the communication component is a radio frequency antenna.

More further, the wireless barcode scanning gun with the electronic tag setting function further includes a radio frequency receiver, where the communication component is in wireless communication connection to the user equipment by means of the radio frequency receiver.

More further, the radio frequency receiver and the barcode scanning gun body are independent of each other.

More further, the user equipment is a computer.

BENEFICIAL EFFECTS

By scanning the tag component with the barcode scanning gun body, the master control component processes the data of the tag component, and one configuration parameter is set for one tag component by means of the user equipment; the user equipment can set a plurality of configuration parameters at the same time; then, the RFID identification component reads the unique identification code of the RFID tag component, and sends it to the master control component; the master control component sends the identification code to the user equipment after it processes the identification code; the user equipment uniformly names the plurality of configuration parameters a configuration of the RFID naming information; and the master control component receives the configuration of the RFID naming information and stores it, thereby achieving parameter matching of the tag components, and binding the matched parameters of a plurality of tag components to one RFID tag component.

When the configuration of the RFID naming information is called, the RFID tag component is re-identified by means of the RFID identification component, and sent to the master control component; and the master control component retrieves the configuration, matched with the identification code data, of the RFID naming information, and runs it.

When the tag components are scanned, the master control component directly retrieves the configuration parameters in the configuration of the RFID naming information, thereby summarizing the configuration parameters of the same type of tag components into one RFID tag component; and meanwhile, the master control component directly retrieves the configuration of the RFID naming information corresponding to the RFID tag component, which improves the recognition efficiency of a scanning device.

BRIEF DESCRIPTION OF DRAWINGS

In order to more clearly illustrate the technical solution in the embodiment of the utility model or in the prior art, a brief introduction to the accompanying drawing needed in the embodiment or the description in the prior art will be provided below. Apparently, the accompanying drawings described below are merely some embodiments of the utility model, and those of ordinary skill in the art may also derive other accompanying drawings from these accompanying drawings without making inventive efforts.

Figure 1:
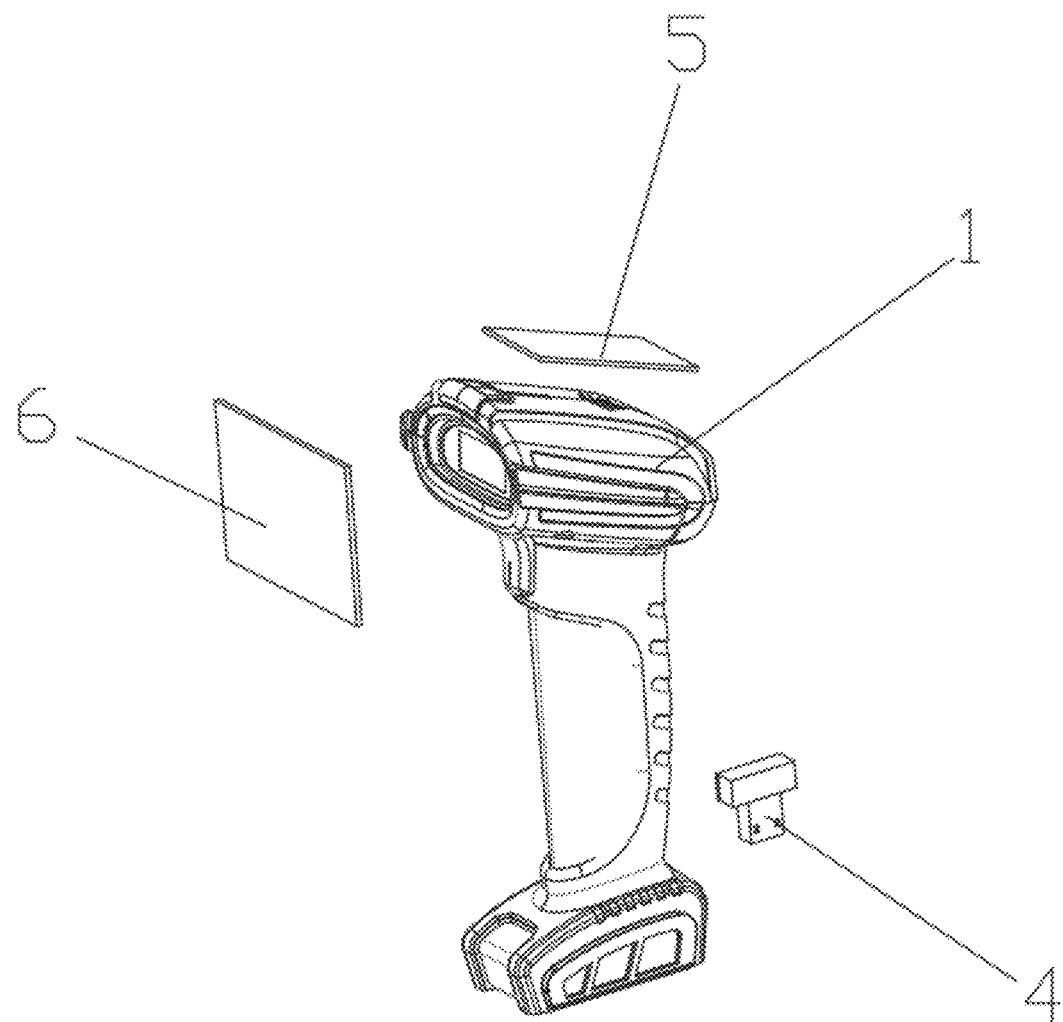
FIG. 1 is a perspective structural diagram of a main body of a wireless barcode scanning gun with an electronic tag setting function of the utility model.

REFERENCE NUMERALS 1. barcode scanning gun body; 11. barcode scanning gun main body; 12. window; 13. barcode scanning component; 2. master control component; 3. RFID identification component; 4. communication component; 5. RFID tag component; 6. tag component; and 7. radio frequency receiver.

DETAILED DESCRIPTION OF THE EMBODIMENTS

In order to make the objectives, the technical solutions and the advantages of the embodiments of the utility model clearer, the technical solutions of the embodiments of the utility model will be clearly and completely described below in combination with the accompanying drawings in the embodiments of the utility model. Apparently, the embodiments described above are only a part, but not all, of the embodiments of the utility model. Based on the embodiments of the utility model, all the other embodiments obtained by that of ordinary skill in the art without inventive effort are within the scope of the utility model.

The utility model will be further described in detail below with reference to the embodiments.

Embodiment 1

Figure 2:
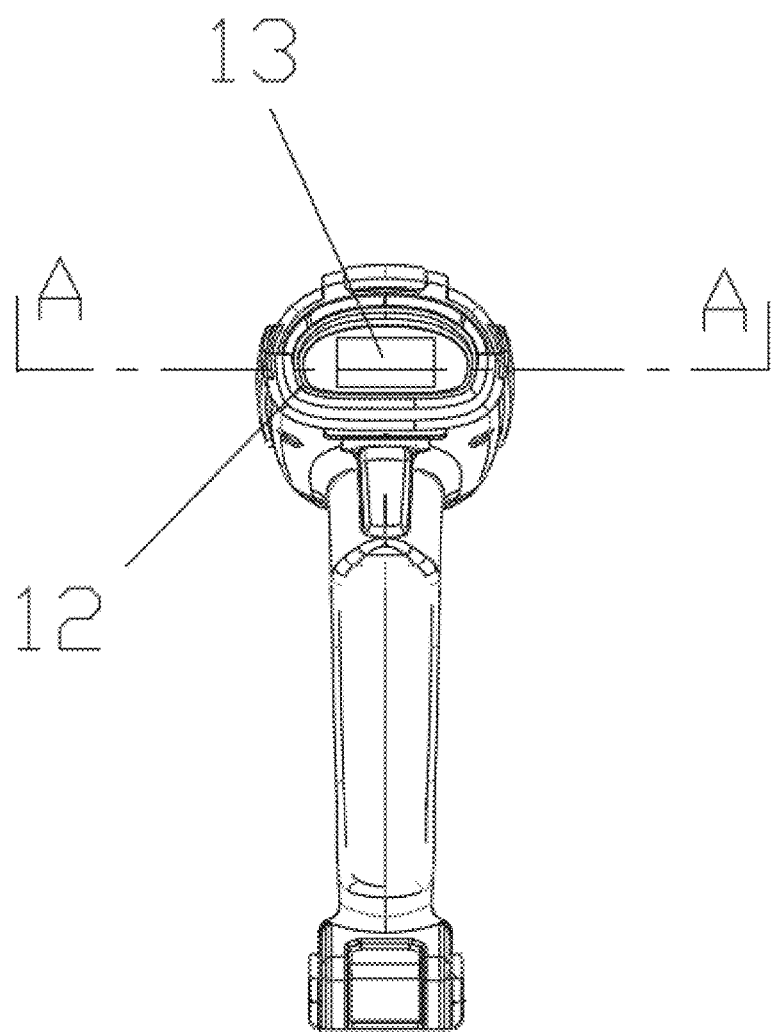
FIG. 2 is a front structural view of a barcode scanning gun of the utility model.
Figure 3:
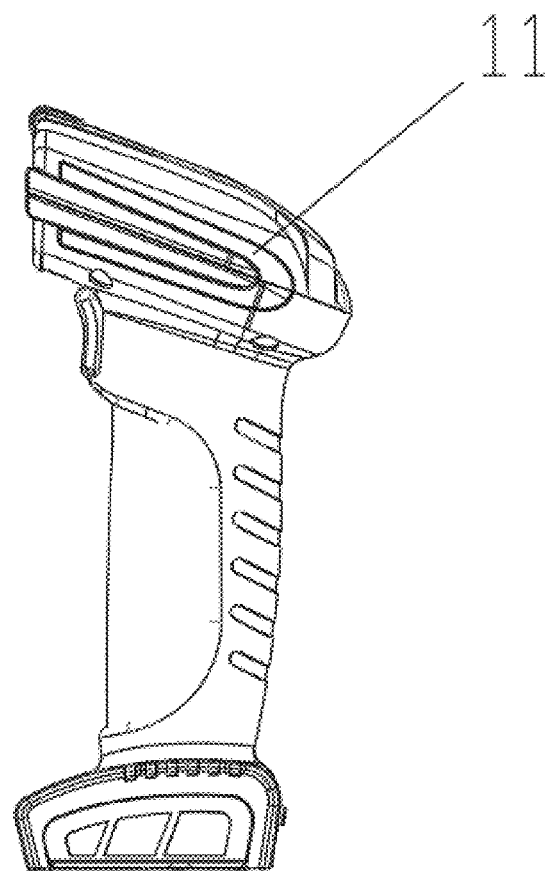
FIG. 3 is a right structural view of a wireless barcode scanning gun with an electronic tag setting function of the utility model.
Figure 4:
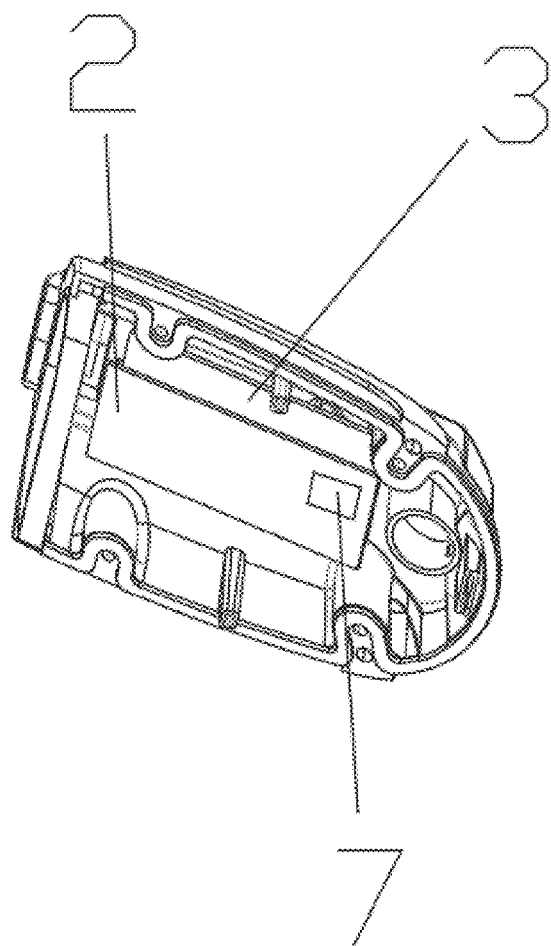
FIG. 4 is a cross-sectional view along the A-A direction in FIG. 2.

Referring to FIGS. 1-4 in Description, a wireless barcode scanning gun with an electronic tag setting function includes a barcode scanning gun body 1, a master control component 2, an RFID identification component 3, an RFID tag component 5 and a tag component 6, where the barcode scanning gun body 1 is used for scanning data of the tag component 6 and transmitting the data to the master control component 2; the master control component 2 and the RFID identification component 3 are both mounted on the barcode scanning gun body 1;

a unique identification code is stored in the RFID tag component 5;

the RFID identification component 3 is used for reading data of the RFID tag component 5 and sending the data to the master control component 2;

the master control component 2 is electrically connected with a communication component 4, and the communication component 4 is in wireless communication connection to user equipment, and used for transmitting data between the master control component 2 and the user equipment;

the user equipment is used for setting a configuration parameter, matched with data of the tag component 6, naming the configuration parameter a configuration, matched with the unique identification code of the RFID tag component 5, of RFID naming information, and sending the configuration to the master control component 2; and the master control component 2 is used for storing the configuration of the RFID naming information while retrieving the configuration of the RFID naming information, and processes data sent by the barcode scanning gun body 1 and the RFID identification component 3.

By scanning the tag component 6 with the barcode scanning gun body 1, the master control component 2 processes the data of the tag component 6, and one configuration parameter is set for one tag component 6 by means of the user equipment; the user equipment can set a plurality of configuration parameters at the same time; then, the RFID identification component 3 reads the unique identification code of the RFID tag component 5, and sends it to the master control component 2; the master control component 2 sends the identification code to the user equipment after it processes the identification code; the user equipment uniformly names the plurality of configuration parameters a configuration of the RFID naming information; the master control component 2 receives the configuration of the RFID naming information and stores it, thereby achieving parameter matching of the tag components 6, and binding the matched parameters of a plurality of tag components 6 to one RFID tag component 5.

When the configuration of the RFID naming information is called, the RFID tag component 5 is re-identified by means of the RFID identification component 3, and sent to the master control component 2; and the master control component 2 retrieves the configuration, matched with the identification code data, of the RFID naming information, and runs it. When the tag components 6 are scanned, the master control component 2 directly retrieves the configuration parameters in the configuration of the RFID naming information, thereby summarizing the configuration parameters of the same type of tag components 6 into one RFID tag component 5; and meanwhile, the master control component 2 directly retrieves the configuration of the RFID naming information corresponding to the RFID tag component 5, which improves the recognition efficiency of a scanning device.

Embodiment 2

In some embodiments, as shown in FIGS. 1-4, the tag component 6 is a QR code or a barcode; and the RFID tag component 5 is an RFID electronic tag.

The barcode scanning gun body 1 includes a barcode scanning gun main body 11, a window 12 and a barcode scanning component 13, where the window 12 is formed in the barcode scanning gun main body 11; the barcode scanning component 13 is fixedly mounted on the barcode scanning gun main body 11, and located at the window 12; and the master control component 2 and the RFID identification component 3 are both mounted on the barcode scanning gun main body 11.

The master control component 2 is a master control board; and the master control board is electrically connected to the RFID identification component 3, the communication component 4 and the barcode scanning component 13.

The RFID identification component 3 is fixedly mounted at an inner end of the barcode scanning gun main body 11.

When this barcode scanning gun is used, for example, in the category of electronic products, there are mice, keyboards, headphones and other small categories; and the mice are classified into luminous mice, wireless mice, wired mice, etc. When this barcode scanning gun is used, a tag component 6 on the luminous mouse, the wireless mouse or the wired mouse is scanned by means of the barcode scanning component 13; the RFID identification component 3 sends data of the tag component 6 to the master control component 2; the master control component 2 processes the data and send it to a computer, as the user equipment, by means of the communication component 4; after configuration parameter information of the tag component 6 on the luminous mouse, the wireless mouse or the wired mouse is set by the computer, as the user equipment, the RFID tag component 5 belonging to the mouse category is identified by the RFID identification component 3; the RFID identification component 3 identifies a unique identification code, representing the mouse category, of the RFID tag component 5 and sends it to the master control component 2; the master control component 2 sends the data to the computer, as the user equipment, after it processes the data; and the computer, as the user equipment, uniformly names the configuration parameter information of all the tag components 6 a configuration of the RFID naming information. If there is need for scanning products belonging to the mouse category, the RFID tag component 5 named the mouse category is re-identified by means of the RFID identification component 3; the RFID identification component 3 sends the unique identification code of the RFID tag component 5 to the master control component 2; and the master control component 2 processes the data and retrieves the configuration, stored in its memory, of the corresponding RFID naming information. At this time, in a case that the barcode scanning component 13 re-scans the tag component 6 of the mouse product, the master control component 2 directly retrieves the corresponding configuration parameter information in the configuration of the RFID naming information.

Embodiment 3

In some embodiments, as shown in FIGS. 1-4, the communication component 4 is a Bluetooth module or a wifi module.

The communication component 4 is a radio frequency antenna.

The wireless barcode scanning gun with the electronic tag setting function further includes a radio frequency receiver 7, where the communication component 4 is in wireless communication connection to the user equipment by means of the radio frequency receiver 7.

The radio frequency receiver 7 and the barcode scanning gun body 1 are independent of each other.

The user equipment is the computer.

The above embodiments are merely intended for describing the technical solution of the utility model rather than limiting the utility model. Although the utility model is described in detail with reference to the above embodiments, those of ordinary skill in the art should understand that they can still make modifications to the technical solution described in the embodiments or equivalent substitutions to some technical features of the technical solution. These modifications or substitutions do not enable the corresponding technical solution to depart from the spirit and scope of the technical solutions in all the embodiments of the utility model.

What is claimed is:

1. A wireless barcode scanning gun with an electronic tag setting function, comprising a barcode scanning gun body (1), a master control component (2), an RFID identification component (3), an RFID tag component (5) and a tag component (6), wherein the barcode scanning gun body (1) is used for scanning data of the tag component (6) and transmitting the data to the master control component (2);

the master control component (2) and the RFID identification component (3) are both mounted on the barcode scanning gun body (1);

a unique identification code is stored in the RFID tag component (5);

the RFID identification component (3) is used for reading data of the RFID tag component (5) and sending the data to the master control component (2);

the master control component (2) is electrically connected with a communication component (4), and the communication component (4) is in wireless communication connection to user equipment, and used for transmitting data between the master control component (2) and the user equipment;

the user equipment is used for setting a configuration parameter matched with data of the tag component (6), naming the configuration parameter a configuration, matched with the unique identification code of the RFID tag component (5), of RFID naming information, and sending the configuration to the master control component (2); and the master control component (2) is used for storing the configuration of the RFID naming information while retrieving the configuration of the RFID naming information, and processes data sent by the barcode scanning gun body (1) and the RFID identification component (3).

2. The wireless barcode scanning gun with the electronic tag setting function according to claim 1, wherein the tag component (6) is a QR code or a barcode; and the RFID tag component (5) is an RFID electronic tag.

3. The wireless barcode scanning gun with the electronic tag setting function according to claim 2, wherein the barcode scanning gun body (1) comprises a barcode scanning gun main body (11), a window (12) and a barcode scanning component (13), wherein the window (12) is formed in the barcode scanning gun main body (11); the barcode scanning component (13) is fixedly mounted on the barcode scanning gun main body (11), and located at the window (12); and the master control component (2) and the RFID identification component (3) are both fixedly mounted on the barcode scanning gun main body (11).

4. The wireless barcode scanning gun with the electronic tag setting function according to claim 3, wherein the master control component (2) is a master control board; and the master control board is electrically connected to the RFID identification component (3), the communication component (4) and the barcode scanning component (13).

5. The wireless barcode scanning gun with the electronic tag setting function according to claim 4, wherein the RFID identification component (3) is fixedly mounted at an inner end of the barcode scanning gun main body (11).

6. The wireless barcode scanning gun with the electronic tag setting function according to claim 1, wherein the communication component (4) is a Bluetooth module or a wifi module.

7. The wireless barcode scanning gun with the electronic tag setting function according to claim 1, wherein the communication component (4) is a radio frequency antenna.

8. The wireless barcode scanning gun with the electronic tag setting function according to claim 7, further comprising a radio frequency receiver (7), wherein the communication component (4) is in wireless communication connection to the user equipment by means of the radio frequency receiver (7).

9. The wireless barcode scanning gun with the electronic tag setting function according to claim 8, wherein the radio frequency receiver (7) and the barcode scanning gun body (1) are independent of each other.

10. The wireless barcode scanning gun with the electronic tag setting function according to claim 1, wherein the user equipment is a computer.

* * * * *